US006942105B2

(12) United States Patent
Smedley et al.

(10) Patent No.: US 6,942,105 B2
(45) Date of Patent: Sep. 13, 2005

(54) IN-LINE FILTRATION FOR A PARTICLE-BASED ELECTROCHEMICAL POWER SYSTEM

(75) Inventors: Stuart I. Smedley, Escondido, CA (US); Jerry Dennis Wilson, Mission Viejo, CA (US); Martin de Tezanos Pinto, Carlsbad, CA (US)

(73) Assignee: Metallic Power, Inc., Carlsbad, CA (US)

( * ) Notice: Subject to any disclaimer, the term of this patent is extended or adjusted under 35 U.S.C. 154(b) by 430 days.

(21) Appl. No.: 10/150,745

(22) Filed: May 17, 2002

(65) Prior Publication Data

US 2003/0215685 A1 Nov. 20, 2003

(Under 37 CFR 1.47)

(51) Int. Cl.[7] .................... B01D 46/10
(52) U.S. Cl. .................... 210/348; 210/486
(58) Field of Search .................... 210/748, 348, 210/486, 162; 429/12; 55/489; 96/15

(56) References Cited

U.S. PATENT DOCUMENTS

| | | | | | |
|---|---|---|---|---|---|
| 2,472,012 | A | * | 5/1949 | Hanneman | 210/457 |
| 3,623,607 | A | * | 11/1971 | Loos | 210/106 |
| 3,663,298 | A | | 5/1972 | McCoy et al. | 136/31 |
| 3,811,952 | A | | 5/1974 | Siwersson et al. | 136/86 |
| 3,847,671 | A | | 11/1974 | Leparulo et al. | 136/86 |
| 3,879,225 | A | | 4/1975 | Backhurst et al. | 136/86 |
| 3,902,918 | A | | 9/1975 | Pompon | 136/86 |
| 3,981,747 | A | | 9/1976 | Doniat et al. | 429/15 |
| 3,985,581 | A | | 10/1976 | Stachurski et al. | 429/51 |
| 4,105,829 | A | | 8/1978 | Venero | 429/15 |
| 4,120,787 | A | * | 10/1978 | Yargeau | 210/664 |
| 4,127,701 | A | | 11/1978 | Symons et al. | 429/19 |
| 4,147,839 | A | | 4/1979 | Solomon et al. | 429/15 |
| 4,172,924 | A | | 10/1979 | Warszawski | 429/15 |
| 4,182,383 | A | | 1/1980 | Adomitis et al. | 141/5 |
| 4,198,475 | A | | 4/1980 | Zaromb | 429/15 |
| 4,247,397 | A | * | 1/1981 | Dobosi | 210/162 |
| 4,287,273 | A | | 9/1981 | Harney et al. | 429/153 |
| 4,352,864 | A | | 10/1982 | Struthers | 429/18 |
| 4,485,154 | A | | 11/1984 | Remick et al. | 429/14 |
| 4,643,745 | A | * | 2/1987 | Sakakibara et al. | 96/76 |
| 4,730,153 | A | | 3/1988 | Breting et al. | 320/14 |
| 4,828,939 | A | | 5/1989 | Turley et al. | 429/38 |
| 4,842,963 | A | * | 6/1989 | Ross, Jr. | 429/21 |
| 4,846,966 | A | * | 7/1989 | Pastore | 210/153 |
| 4,950,561 | A | | 8/1990 | Niksa et al. | 429/27 |
| 5,006,424 | A | | 4/1991 | Evans et al. | 429/15 |
| 5,034,122 | A | * | 7/1991 | Wiesemann | 210/162 |

(Continued)

FOREIGN PATENT DOCUMENTS

| | | | |
|---|---|---|---|
| DE | 10164300 A1 | * | 7/2004 |
| FR | 2639767 | | 11/1988 |
| FR | 2669775 | | 11/1990 |
| JP | 51-494439 | | 4/1976 |

OTHER PUBLICATIONS

Appleby, A. J. et al.: *The C.G.E Circulating Zinc/Air Battery: A Practical Vehicle Power Source:* Journal of Power Sources: 1976/1977: vol. 1: pp. 17–24.

(Continued)

*Primary Examiner*—Frank M. Lawrence
(74) *Attorney, Agent, or Firm*—Howrey Simon Arnold & White LLP

(57) ABSTRACT

A system for filtering particles within a multiphase fluid that comprises a particulate phase is disclosed. The system comprises a first plurality of substantially parallel, substantially planar thin slabs separated by a predetermined distance to retain particles having a maximum cross-sectional dimension greater than the predetermined distance, and provides at least one flow path for at least part of the multiphase fluid. In one application, the system is used in connection with an electrochemical power source and components thereof, wherein the multiphase fluid comprises flowable fuel.

14 Claims, 5 Drawing Sheets

U.S. PATENT DOCUMENTS

| | | | | |
|---|---|---|---|---|
| 5,156,925 | A | 10/1992 | Lapp | 429/19 |
| 5,168,905 | A | 12/1992 | Phallen | 141/1 |
| 5,188,911 | A | 2/1993 | Downing et al. | 429/70 |
| 5,196,275 | A | 3/1993 | Goldman et al. | 429/27 |
| 5,208,526 | A | 5/1993 | Goldman et al. | 320/2 |
| 5,260,144 | A | 11/1993 | O'Callaghan | 429/14 |
| 5,318,861 | A | 6/1994 | Harats et al. | 429/21 |
| 5,360,680 | A | 11/1994 | Goldman et al. | 429/27 |
| 5,378,329 | A | 1/1995 | Goldstein et al. | 204/115 |
| 5,405,713 | A | 4/1995 | Pecherer et al. | 429/49 |
| 5,411,815 | A | 5/1995 | Goldstein | 429/50 |
| 5,434,020 | A | 7/1995 | Cooper | 429/210 |
| 5,441,820 | A | 8/1995 | Siu et al. | 429/17 |
| 5,558,947 | A | 9/1996 | Robison | 429/13 |
| 5,569,551 | A | 10/1996 | Pedicini et al. | 429/27 |
| 5,578,183 | A | 11/1996 | Cooper | 205/64 |
| 5,635,051 | A | 6/1997 | Salas-Morales et al. | 205/602 |
| 5,849,427 | A | 12/1998 | Siu et al. | 429/19 |
| 5,869,200 | A | 2/1999 | Nunnally | 429/10 |
| 5,958,210 | A | 9/1999 | Siu et al. | 205/602 |
| 6,153,329 | A | 11/2000 | Raschilla | 429/65 |
| 6,706,433 | B2 * | 3/2004 | Pinto et al. | 429/15 |

OTHER PUBLICATIONS

Appleby, A.J. et al.: *Charge–Discharge Behavior of the C.G.E. Circulating Zinc–Air Vehicle Battery;* Society of Automotive Engineers, Cobo Hall, Detroit; Feb. 28–Mar. 4, 1977.

Cooper, J., et al.; *Demonstration of a Zinc/Air Fuel Battery to Enhance the Range and Mission of Fleet Electric Vehicles: Preliminary Results in the Refueling of a Multicell Module;* 29$^{th}$ Intersociety Energy Conversion Engineering Conference; Aug. 8, 1994; 8 pages.

Cooper, J.: *How the Zinc/Air Battery is Refueling the Competitiveness of Electric Vehicles:* Science & Technology Review ; Oct. 1995; pp. 7–13.

* cited by examiner

IN-LINE FILTRATION FOR A PARTICLE-BASED ELECTROCHEMICAL POWER SYSTEM

FIELD OF THE INVENTION

The invention relates generally to particle-based electrochemical power systems, and, more specifically, to metal particle-based electrochemical power systems, and filter-based methods and apparatus for maintaining the particle size of the particles of a multiphase fluid flow used in the particle-based electrochemical power systems.

RELATED ART

Utilization of a zinc particle-containing potassium hydroxide reaction medium in a zinc-air fuel cell is subject to numerous challenges. Included among these are potentials for the zinc particles to grow in size via agglomeration and/or electrodeposition and to form potential short-circuit-inducing dendrites. Unfortunately, these potentials can lead to diminished flow through and/or clogging of the reaction solution flow system, and a resulting reduction in flow to the cells of the zinc-air fuel cell of suitably sized zinc particles needed to maintain a suitable anode bed in the zinc-air fuel cell.

SUMMARY

In one aspect, the invention comprises filter system(s) for use in a flow of a multiphase fluid that comprises a particulate phase in an amount greater than a predetermined weight percent. The filter system(s) can be configured to provide at least one flow path for the multiphase fluid and to retain particles of the particulate phase whose largest cross-sectional dimension is greater than a predetermined distance.

In another aspect, the invention comprises method(s) of retaining particles, whose largest cross-sectional dimension is greater than a predetermined distance, from a multiphase fluid flow that comprises a particulate phase in an amount greater than a predetermined weight percent. The method(s) can comprise delivering the multiphase fluid flow through a filter system, where the filter system is configured to provide at least one flow path for the multiphase fluid flow and to retain the particles. Optionally, the method(s) can further comprise configuring the filter system to reduce a cross-sectional dimension of the retained particle(s) below the predetermined distance.

Generally, the predetermined weight percent contemplated for use in accordance with the invention can be in the range(s) from about 0.01 weight percent to about 10 weight percent.

In a further aspect, the invention comprises component(s) for a particle-based electrochemical power system. The component(s) can comprise a power source, a fuel storage unit, a filter system, and one or more flow paths between the fuel storage unit and the power source. The fuel storage unit can contain a multiphase flowable fuel that comprises a particulate phase. The filter system can be configured to retain particles of the particulate phase whose largest cross-sectional dimension is greater than a predetermined distance. The one or more flow paths can be configured to provide the multiphase flowable fuel between the fuel storage and the power source, such that at least one of the flow paths is directed through the filter system.

In an additional aspect, the invention comprises method(s) of using particle-based electrochemical power source component(s), which component(s) can comprise a filter system and one or more flow paths for a multiphase fluid that comprises a particulate phase. Using can comprise operating, testing, other utilizings, and the like, and suitable combinations thereof. The method(s) can comprise delivering a flow of the multiphase fluid through the filter system along at least one of the flow paths. The method(s) can further comprise configuring the filter system to retain particles of the particulate phase whose largest cross-sectional dimension is greater than a predetermined distance.

In another aspect, the invention comprises particle-based electrochemical power system(s) that can comprise component(s) in accordance with a further aspect of the invention.

In a further aspect, the invention comprises method(s) of using particle-based electrochemical power source system (s), which system(s) can comprise a power source, a fuel storage unit, a filter system and one or more flow paths for a multiphase fluid that comprises a particulate phase. Using can comprise operating, testing, other utilizings, and the like, and suitable combinations thereof. The method(s) can comprise delivering a flow of the multiphase fluid through the filter system along at least one of the flow paths. The method(s) can further comprise configuring the filter system to retain particles of the particulate phase whose largest cross-sectional dimension is greater than a predetermined distance.

Typically, the predetermined distance contemplated for use in accordance with the invention is configured to assist in the operation of the particle-based electrochemical power source system(s). In selected embodiments, the predetermined distance can be determined on a relative basis (e.g., as a percentage of the average largest cross-sectional dimension of the particles, as measured prior to initiation of, or during, the flow) or on an absolute basis (e.g., in the range(s) from about 500 nm to about 5 mm).

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating some principles of the invention. In the figures, like reference numerals designate corresponding parts throughout the different views.

DETAILED DESCRIPTION

In one aspect, the invention comprises filter system(s) for use in a flow of a multiphase fluid that comprises a particulate phase in an amount greater than about a predetermined weight percent.

Typically, the multiphase fluid is useful as a fuel in an electrochemical power source. In one embodiment, the predetermined weight percent is in the range(s) from about from about 0.01 weight percent to about 10 weight percent. In one embodiment, the predetermined weight percent is about 0.025 weight percent. "Weight percent" can be calculated by a variety of means, as known to those of skill in the art, but, in one embodiment, is calculated by measuring the mass of the fuel present in a given volume of the multiphase fluid, and dividing this mass by the total mass of multiphase fluid (e.g., fuel particles and reaction solution) in this same given volume.

Figure 1:
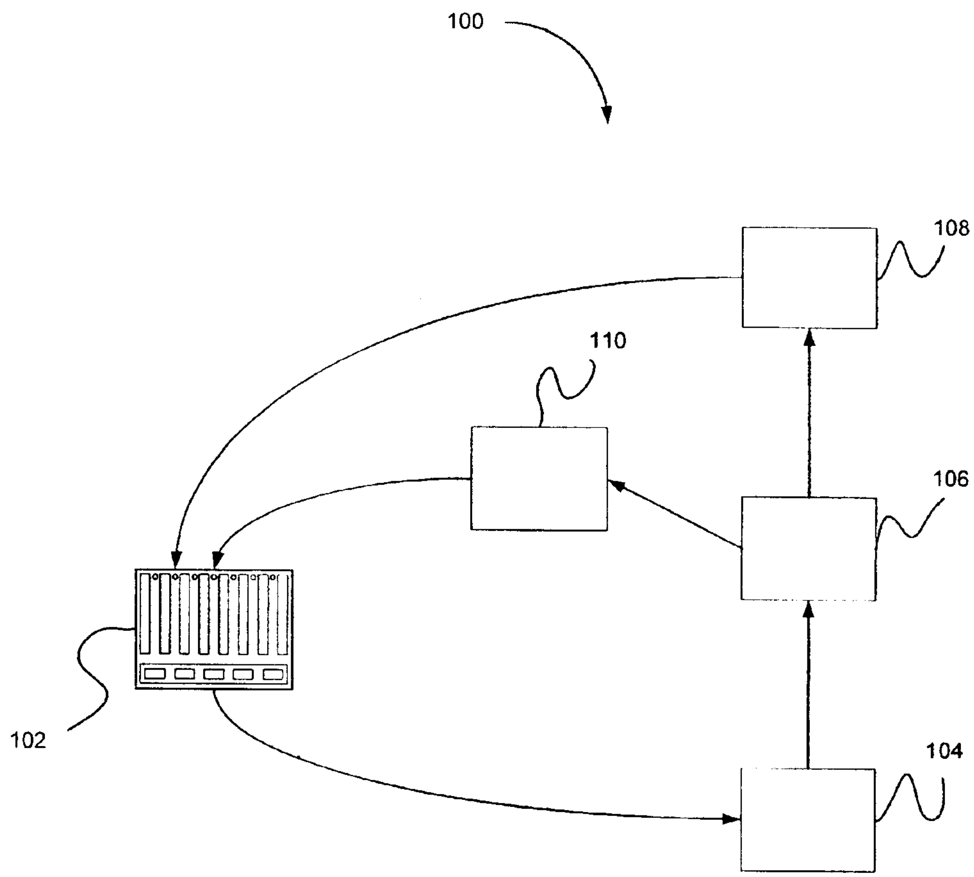
FIG. 1 is a simplified block diagram of one embodiment of an electrochemical power source system.

The filter system is configured to provide a flow path for the multiphase fluid therethrough. The filter system can be located along any suitable flow path for the multiphase fluid flow in the electrochemical power system. Turning to FIG. 1, a filter system according to the invention can be located along any of the flow path(s) between different components of the electrochemical power system. In one embodiment, the filter system can be located between fuel storage unit 108 and power source 102. Alternately or in addition, the filter system can be located between fuel storage unit 108 and any of the optional components of the electrochemical power system, and/or between any two of the optional components of the electrochemical power system. Conduits provide a flow path for the multiphase fluid between each of the filter system and each adjacent electrochemical power system component.

The filter system is also configured to retain particles of the particulate phase whose largest cross-sectional dimension is greater than a predetermined distance. Typically, the predetermined distance contemplated for use in accordance with the invention is configured to assist in the operation of the invention particle-based electrochemical power source system(s). In one embodiment, the predetermined distance is in the range(s) from about 110% to about 400%, and/or in the range(s) from about 200% to about 300%, of the average largest cross-sectional dimension of the particles, as calculated prior to initiation of, or during, the flow. In another embodiment, the predetermined distance is in the range(s) from about 500 nanometers (nm) to about 5 millimeters (mm), and/or in the range(s) from about 0.2 mm to about 3 mm.

The average largest cross-sectional dimension of the particles can be calculated by a variety of methods, such as (i) by measuring the cross-section of a statistically significant fraction of the particles and calculating the average cross-section therefrom, and/or (ii) by screening the particles through a series of screens so as to determine the mass fraction of particles above a size that is deemed to be about the largest acceptable cross-section, and/or (iii) the like. Alternately or in addition, the average largest cross-sectional dimension of the particles can be calculated from the bulk properties of the particles that are mixed into the multiphase fluid prior to initiation of a flow thereof.

Typically, the particles of the particulate phase being retained comprise the fuel of an electrochemical power source, although other particles can be utilized as appropriate. In one embodiment, the particles can comprise metal-containing particles. Alternately or in addition, the metal-containing particles can comprise zinc-containing particles. Alternately or in addition, the metal-containing particles can be sized so that the average largest cross-sectional dimension of the zinc-containing particles is not greater than about the predetermined distance.

The filter system can be configured in a variety of ways to both provide a flow path for the multiphase fluid and retain certain particles of the multiphase fluid. In one embodiment, the filter system comprises a first plurality of substantially parallel, substantially planar, thin slabs.

Figure 3A:
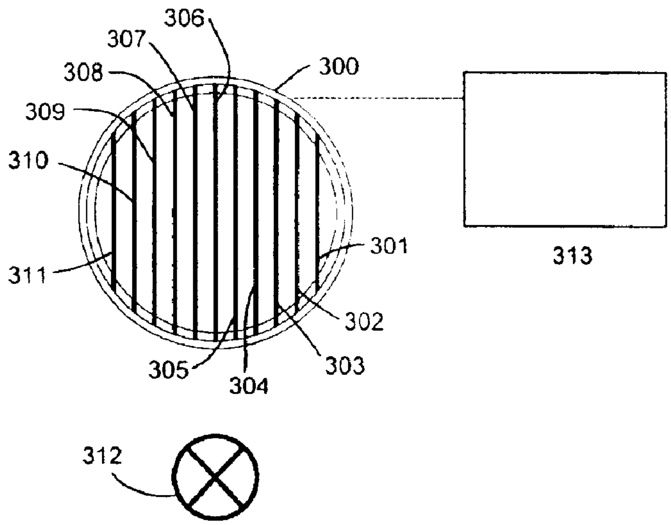
FIGS. 3A and 3B are simplified block diagrams of an embodiment of a filter system according to the invention, with FIG. 3A representing a cross-section perpendicular to a flow path therethrough, and FIG. 3B representing a cross-section parallel to a flow path therethrough.
Figure 3B:
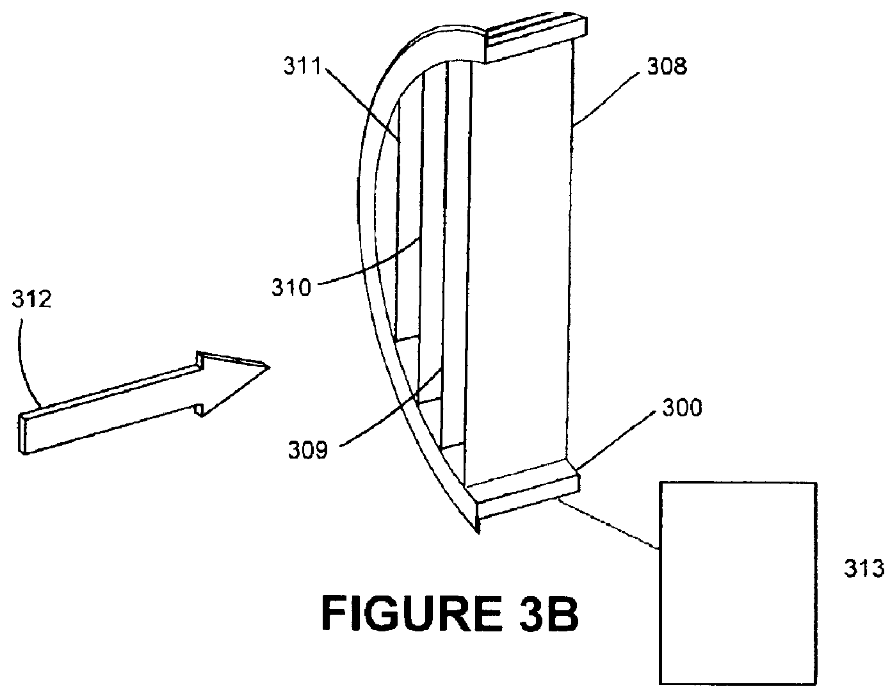
Figure 4A:
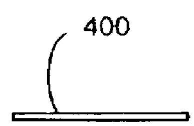
FIGS. 4A–4C are simplified diagrams of embodiments of a slab useful in a filter system according to the invention, with FIG. 4A being a cross-section in the thin dimension of one embodiment of the slab, FIG. 4B being a cross-section in the thin dimension of an alternative embodiment of the slab, and FIG. 4C being a cross-section in the planar dimension of the slab.
Figure 4B:
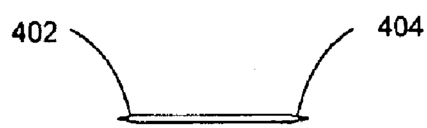
Figure 4C:
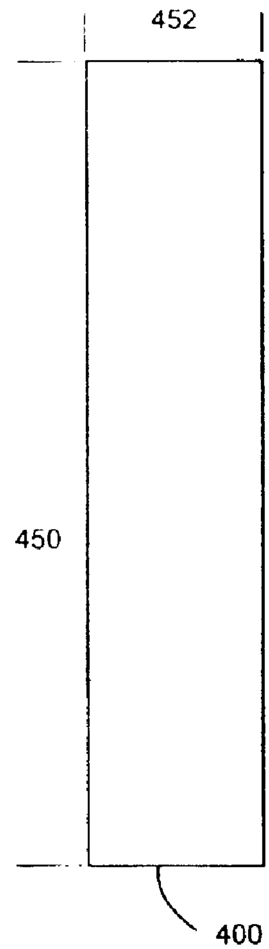

FIGS. 3A and 3B depict an embodiment of a filter system 300, and FIGS. 4A–4C show an embodiment of a slab 400 for use in accordance with the invention. FIG. 3B is the same filter system as that represented in FIG. 3A, absent slabs 304 and 308 (removed for clarity) and rotated ninety degrees to the left. Although 11 slabs (slabs 301–311) are represented in filter system 300, the filter system could comprise greater or fewer slabs depending on the desired predetermined distance and/or the desired average largest cross-sectional dimension of the particles. Slabs 301–311 are substantially parallel to each other, as seen in FIGS. 3A and 3B. Slabs 301–311 are also substantially planar as seen in FIGS. 3A, 3B and 4B, although one optional embodiment, as seen in FIG. 4B, provides that a representative slab 400 can taper at the two edges 402, 404 that contact the multiphase fluid flow. FIG. 4C is a side, planar view of slab 400 illustrating the short dimension 452 and the long dimension 450.

In this configuration, each slab of the first plurality is separated from adjacent slab(s) by about the predetermined distance. The slabs of the first plurality are oriented in the filter system so that the substantially planar surface of the slabs is substantially parallel to the multiphase fluid flow (direction of flow is 312 in FIGS. 3A and 3B). In one embodiment, each of the slabs comprises a material that is substantially electrically conductive. Examples of materials that are substantially electrically conductive include stainless steel, magnesium, titanium, nickel, metals that are substantially inert to corrosion in a base solution, suitable alloys of any of the foregoing, and the like, and suitable combinations of two or more of the foregoing.

The filter system configured with slabs in accordance with the invention can also comprise a DC electrical power supply 313 operatively connected to each of the slabs. This DC electrical power supply 313 can be used, among other reasons, to electrochemically dissolve particles that are retained by the filter system. Thus, in one embodiment, the filter system has the DC electrical power supply 313 operating for at least a portion of the time that the filter system is operating, whereas, in an alternative or additional embodiment, the filter system has the DC electrical power supply 313 operating for the entire time that the filter system is operating.

Many suitable multiphase fluids are contemplated for use in accordance with the invention, depending on the end use application of the filter system. In one embodiment, the filter system configured with slabs in accordance with the invention can also be configured to operate with a multiphase fluid comprising an acid solution or a base solution, and with slabs comprising a material that is substantially inert to corrosion in the acid solution or the base solution. In one alternative, the multiphase fluid comprises a base solution, and each of the slabs comprises a material that is substantially inert to corrosion in the base solution. In another alternative, the multiphase fluid comprises potassium hydroxide (KOH).

Figure 5A:
FIGS. 5A and 5B are simplified block diagrams of an alternative embodiment of a "string-like", "planar" slab useful in a filter system according to the invention.
Figure 5B:

In one embodiment, the substantially planar surface of each of the slabs has a dimension in a direction substantially parallel to the flow (e.g., dimension 452 in FIG. 4C) in the range(s) that are not greater than about 5 times, and/or about 3 times, the average largest cross-sectional dimension of the particles and/or the predetermined distance. Alternatively or in addition, this dimension is about the smallest dimension of the slab. Thus, FIGS. 5A and 5B illustrate a "slab" which is thin, but more string-like than planar. FIG. 5A is an end view while FIG. 5B is a side view. Selection of suitable slabs will depend on a variety of criteria, including, among others, the force of the flow to be exerted against the slabs by the multiphase fluid flow and the material(s) from which the slab will be made.

The filter system configured with slabs in accordance with the invention can also comprise a second plurality of substantially parallel, substantially planar, thin slabs downstream from the first plurality along the flow path. Each slab of the second plurality is separated by about the predetermined distance from adjacent slab(s) of the second plurality. Moreover, the slabs of the second plurality are oriented in the filter system so that the substantially planar surface of the slabs is substantially parallel to the multiphase fluid flow. The slabs of this second plurality can be further configured, alternatively or in addition, in a similar fashion as, and/or can comprise additional elements of, the slabs of the first plurality.

In one embodiment, the slabs of the second plurality can be oriented in the filter system at a variety of angles relative to the slabs of the first plurality. Although orientation angles in the range(s) from about 0 degrees to about 90 degrees can be utilized, one embodiment provides that the orientation angle be about 90 degrees.

In one embodiment, the thin dimension of the thin slabs (e.g., that smallest dimension across the slab(s) 400 in FIGS. 4A and 4B) of the first plurality and/or the second plurality can be in the range(s) from about 500 nm to about 1 mm.

In another aspect, the invention comprises method(s) of retaining particles, whose largest cross-sectional dimension is greater than a predetermined distance, from a multiphase fluid flow that comprises a particulate phase in an amount greater than a predetermined weight percent. The method(s) can comprise delivering the multiphase fluid flow through a filter system, where the filter system is configured to provide at least one flow path for the multiphase fluid flow and to retain the particles.

Optionally, the method(s) can further comprise configuring the filter system to reduce a cross-sectional dimension of the retained particle(s) below the predetermined distance. In one embodiment, the cross-sectional dimension of the retained particle(s) is reduced via electrochemistry, mechanical forces, or suitable combinations thereof. Multiphase fluid characteristics (e.g., particle weight percent), predetermined distances, particle characteristics, and average largest cross-sectional dimensions of particles for the method(s) are as set forth in the description of the filter system, and can each be alternatively or additionally incorporated into the invention method(s).

The filter system, and its additional or alternative components and/or configurations are also as set forth above, and each of these components and/or configurations can be alternatively or additionally incorporated into the invention method(s).

In one embodiment, the method(s) can further be configured such that the multiphase fluid flow comprises a reaction solution, and the reaction solution flows through the filter system at a superficial velocity in the range from about 10 cm/min to about 200 cm/min. The superficial velocity can be calculated, among other ways, by dividing the flow rate of the multiphase fluid (e.g., electrolyte fluid) by the cross-sectional area of the cell cavity(ies) (assuming no particles are present) through which the multiphase fluid (e.g., electrolyte fluid) passes.

In a further aspect, the invention comprises component(s) for a particle-based electrochemical power system.

As an introduction to electrochemical power systems, electrochemical power systems comprise a variety of fuel cells. A metal fuel cell is a fuel cell that uses a metal, such as zinc particles, as fuel. In a metal fuel cell, the fuel is generally stored, transmitted and used in the presence of a reaction medium, such as potassium hydroxide solution.

A block diagram of a fuel cell is illustrated in FIG. 1. As illustrated, the fuel cell comprises a power source 102, an optional reaction product storage unit 104, an optional regeneration unit 106, a fuel storage unit 108, and an optional second reactant storage unit 110. The power source 102 in turn comprises one or more cells each having a cell body defining a cell cavity, with an anode and cathode situated in each cell cavity. The cells can be coupled in parallel or series, or independently coupled to different electrical loads. In one implementation, they are coupled in series.

The anodes within the cell cavities in power source 102 comprise the fuel stored in fuel storage unit 108 or an electrode. Within the cell cavities of power source 102, an electrochemical reaction takes place whereby the anode releases electrons, and forms one or more reaction products. Through this process, the anodes are gradually consumed.

The electrons released from the electrochemical reaction at the anode flow through a load to the cathode, where they react with one or more second reactants from an optional second reactant storage unit 110 or from some other source. This flow of electrons through the load gives rise to an over-potential (i.e., work) required to drive the demanded current, which over-potential acts to decrease the theoretical voltage between the anode and the cathode. This theoretical voltage arises due to the difference in electrochemical potential between the anode (for example, in the case of a zinc fuel cell, Zn potential of −1.215V versus SHE (standard hydrogen electrode) reference at open circuit) and cathode ($O_2$ potential of +0.401V versus SHE reference at open circuit). When the cells are combined in series, the sum of the voltages for the cells forms the output of the power source.

The one or more reaction products can then be provided to optional reaction product storage unit 104 or to some other destination. The one or more reaction products, from unit 104 or some other source, can then be provided to optional regeneration unit 106, which regenerates fuel and/or one or more of the second reactants from the one or more reaction products. The regenerated fuel can then be provided to fuel storage unit 108, and/or the regenerated one or more second reactants can then be provided to optional second reactant storage unit 110 or to some other destination. As an alternative to regenerating the fuel from the reaction product using the optional regeneration unit 106, the fuel can be inserted into the system from an external source and the reaction product can be withdrawn from the system.

The optional reaction product storage unit 104 comprises a unit that can store the reaction product. Exemplary reaction product storage units include without limitation one or more tanks, one or more sponges, one or more containers, one or more vats, one or more canisters, one or more chambers, one or more cylinders, one or more cavities, one or more barrels, one or more vessels, and the like, including without limitation those found in or which may be formed in a substrate, and suitable combinations of any two or more thereof. Optionally, the optional reaction product storage unit 104 is detachably attached to the system.

The optional regeneration unit 106 comprises a unit that can electrolyze the reaction product(s) back into fuel (e.g., electroactive particles, including without limitation metal particles and/or metal-coated particles, electroactive electrodes, and the like, and suitable combinations of any two or more thereof) and/or second reactant (e.g., air, oxygen, hydrogen peroxide, other oxidizing agents, and the like, and suitable combinations of any two or more thereof). Exemplary regeneration units include without limitation metal (e.g., zinc) electrolyzers (which regenerate a fuel (e.g., zinc) and a second reactant (e.g., oxygen) by electrolyzing a reaction product (e.g., zinc oxide (ZnO)), and the like. Exemplary metal electrolyzers include without limitation fluidized bed electrolyzers, spouted bed electrolyzers, and the like, and suitable combinations of two or more thereof. The power source 102 can optionally function as the optional regeneration unit 106 by operating in reverse, thereby foregoing the need for a regeneration unit 106 separate from the power source 102. Optionally, the optional regeneration unit 106 is detachably attached to the system.

The fuel storage unit 108 comprises a unit that can store the fuel (e.g., for metal fuel cells, electroactive particles, including without limitation metal (or metal-coated) particles, liquid born metal (or metal-coated) particles, and the like; electroactive electrodes, and the like, and suitable combinations of any two or more thereof). Exemplary fuel storage units include without limitation one or more of any of the enumerated types of reaction product storage units, which in one embodiment are made of a substantially non-reactive material (e.g., stainless steel, plastic, or the like), for holding potassium hydroxide (KOH) and metal (e.g., zinc (Zn), other metals, and the like) particles, separately or together, and the like, and suitable combinations of any two or more thereof. Optionally, the fuel storage unit 108 is detachably attached to the system.

The optional second reactant storage unit 110 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more of any of the enumerated types of reaction product storage units, which in one embodiment are made of a substantially non-reactive material, and the like, and suitable combinations of any two or more thereof. Optionally, the optional second reactant storage unit 110 is detachably attached to the system.

In one embodiment, the fuel cell is a metal fuel cell. The fuel of a metal fuel cell is a metal that can be in a form to facilitate entry into the cell cavities of the power source 102. For example, the fuel can be in the form of metal (or metal-coated) particles or liquid born metal (or metal-coated) particles or suitable combinations of any two or more thereof Exemplary metals for the metal (or metal-coated) particles include without limitation zinc, aluminum, lithium, magnesium, iron, sodium, and the like. Suitable alloys of such metals can also be utilized for the metal (or metal-coated) particles.

In this embodiment, when the fuel is optionally already present in the anode of the cell cavities in power source 102 prior to activating the fuel cell, the fuel cell is pre-charged, and can start-up significantly faster than when there is no fuel in the cell cavities and/or can run for a time in the range(s) from about 0.001 minutes to about 1000 minutes without additional fuel being moved into the cell cavities. The amount of time which the fuel cell can run on a pre-charge of fuel within the cell cavities can vary with, among other factors, the pressurization of the fuel within the cell cavities, and the power drawn from the fuel cell, and alternative embodiments of this aspect of the invention permit such amount of time to be in the range(s) from about 1 second to about 1000 minutes or more, and in the range(s) from about 30 seconds to about 1000 minutes or more.

Moreover, the second reactant optionally can be present in the fuel cell and pre-pressurized to any pressure in the range(s) from about 0 psi gauge pressure to about 200 psi gauge pressure. Furthermore, in this embodiment, one optional aspect provides that the volumes of one or both of the fuel storage unit 108 and the optional second reactant storage unit 110 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about $10^{-12}$ liters to about 1,000,000 liters. In another embodiment, the volumes can vary in the range(s) from about $10^{-12}$ liters to about 10 liters.

In one aspect of this embodiment, at least one of, and optionally all of, the metal fuel cell(s) is a zinc fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products can be the zincate ion, $$Zn(OH)_4^{2-},$$

or zinc oxide, ZnO, and the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 110 can be excluded), or from the second reactant storage unit 110. Similarly, when the second reactant is oxygen in water, the water can be provided from the second reactant storage unit 110, or from some other source, e.g., tap water (in which case the optional second reactant storage unit 110 can be excluded). In order to replenish the cathode, to deliver second reactant(s) to the cathodic area, and to facilitate ion exchange between the anodes and cathodes, a flow of the second reactant(s) can be maintained through a portion of the cells. This flow optionally can be maintained through one or more pumps (not shown in FIG. 1), blowers or the like, or through some other means. If the second reactant is air, it optionally can be pre-processed to remove $CO_2$ by, for example, passing the air through soda lime. This is generally known to improve performance of the fuel cell.

In this embodiment, the particulate fuel of the anodes is gradually consumed through electrochemical dissolution. In order to replenish the anodes, to deliver KOH to the anodes, and to facilitate ion exchange between the anodes and cathodes, a recirculating flow of the fluid borne zinc particles can be maintained through the cell cavities. This flow can be maintained through one or more pumps (not shown), convection, flow from a pressurized source, or through some other means.

As the potassium hydroxide contacts the zinc anodes, the following reaction takes place at the anodes:

$$Zn + 4OH^- \rightarrow Zn(OH)_4^{2-} + 2e^- \quad (1)$$

The two released electrons flow through a load to the cathode where the following reaction takes place:

$$\frac{1}{2}O_2 + 2e^- + H_2O \rightarrow 2OH^- \quad (2)$$

The reaction product is the zincate ion, $$Zn(OH)_4^{2-},$$

which is soluble in the reaction solution KOH. The overall reaction which occurs in the cell cavities is the combination of the two reactions (1) and (2). This combined reaction can be expressed as follows:

$$Zn + 2OH^- + \frac{1}{2}O_2 + H_2O \rightarrow Zn(OH)_4^{2-} \quad (3)$$

Alternatively, the zincate ion, $$Zn(OH)_4^{2-},$$

can be allowed to precipitate to zinc oxide, ZnO, a second reaction product, in accordance with the following reaction:

$$Zn(OH)_4^{2-} \rightarrow ZnO + H_2O + 2OH^- \quad (4)$$

In this case, the overall reaction which occurs in the cell cavities is the combination of the three reactions (1), (2), and (4). This overall reaction can be expressed as follows:

$$Zn + \frac{1}{2}O_2 \rightarrow ZnO \quad (5)$$

Under real world conditions, the reactions (3) or (5) yield an open-circuit voltage potential of about 1.4V. For additional information on this embodiment of a zinc/air battery or fuel cell, the reader is referred to U.S. Pat. Nos. 5,952,117; 6,153,329; and 6,162,555, which are hereby incorporated by reference herein as though set forth in full. The reaction product $$Zn(OH)_4^{2-},$$

and also possibly ZnO, can be provided to reaction product storage unit 104. Optional regeneration unit 106 can then reprocess these reaction products to yield oxygen, which can be released to the ambient air or stored in second reactant storage unit 110, and zinc particles, which are provided to fuel storage unit 108. In addition, the optional regeneration unit 106 can yield water, which can be discharged through a drain or stored in second reactant storage unit 110 or fuel storage unit 108. It can also regenerate hydroxide, OH—, which can be discharged or combined with potassium ions to yield the potassium hydroxide reaction solution.

The regeneration of the zincate ion, $$Zn(OH)_4^{2-},$$

into zinc, and one or more second reactants can occur according to the following overall reaction:

$$Zn(OH)_4^{2-} \rightarrow Zn + 2OH^- + H_2O + \frac{1}{2}O_2 \quad (6)$$

The regeneration of zinc oxide, ZnO, into zinc, and one or more second reactants can occur according to the following overall reaction:

$$ZnO \rightarrow Zn + \frac{1}{2}O_2 \quad (7)$$

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, sodium fuel cells, and the like are possible, as are metal fuel cells where the fuel is not in particulate form but in another form such as without limitation sheets, ribbons, strings, slabs, plates, or the like, or suitable combinations of any two or more thereof. Embodiments are also possible in which the fuel is not fluid borne or continuously re-circulated through the cell cavities (e.g., porous plates of fuel, ribbons of fuel being cycled past a reaction zone, and the like). It is also possible to avoid an electrolytic reaction solution altogether or at least employ reaction solutions comprising elements other than potassium hydroxide, for example, without limitation, reaction solutions comprising sodium hydroxide, inorganic alkalis, alkali or alkaline earth metal hydroxides or aqueous salts such as sodium chloride, or the like, or suitable combinations of any two or more thereof. See, for example, U.S. Pat. No. 5,958,210, the entire contents of which are incorporated herein by this reference. It is also possible to employ metal fuel cells that output AC power rather than DC power using an inverter, a voltage converter, or the like, or suitable combinations of any two or more thereof.

In a second embodiment of a fuel cell useful in the practice of the invention system, a metal fuel cell system is provided. Such system is characterized in that it has one, or any suitable combination of two or more, of the following properties: the system optionally can be configured to not utilize or produce significant quantities of flammable fuel or product, respectively; the system can provide primary and/or auxiliary/backup power to the one or more loads for an amount of time limited only by the amount of fuel present (e.g., in the range(s) from about 0.01 hours to about 10,000 hours or more, and in the range(s) from about 0.5 hours to about 650 hours, or more); the system optionally can be configured to have an energy density in the range(s) from about 35 Watt-hours per kilogram of combined fuel and electrolyte (reaction medium) added to about 400 Watt-hours per kilogram of combined fuel and electrolyte added; the system optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of the one or more load(s) comprising the system (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours; in yet another embodiment, the energy requirement can range from $5\times10^{-12}$ Watt-hours to 50,000 Watt-hours); the system optionally can be configured to have a fuel storage unit that can store fuel at an internal pressure in the range(s) from about 5 pounds per square inch (psi) gauge pressure to about 200 psi gauge pressure; the system optionally can be configured to operate normally while generating noise in the range(s) from about 1 dB to about 50 dB (when measured at a distance of about 10 meters therefrom), and alternatively in the range(s) of less than about 50 dB (when measured at distance of about 10 meters therefrom). In one implementation, this metal fuel cell system comprises a zinc fuel cell system.

Figure 2:
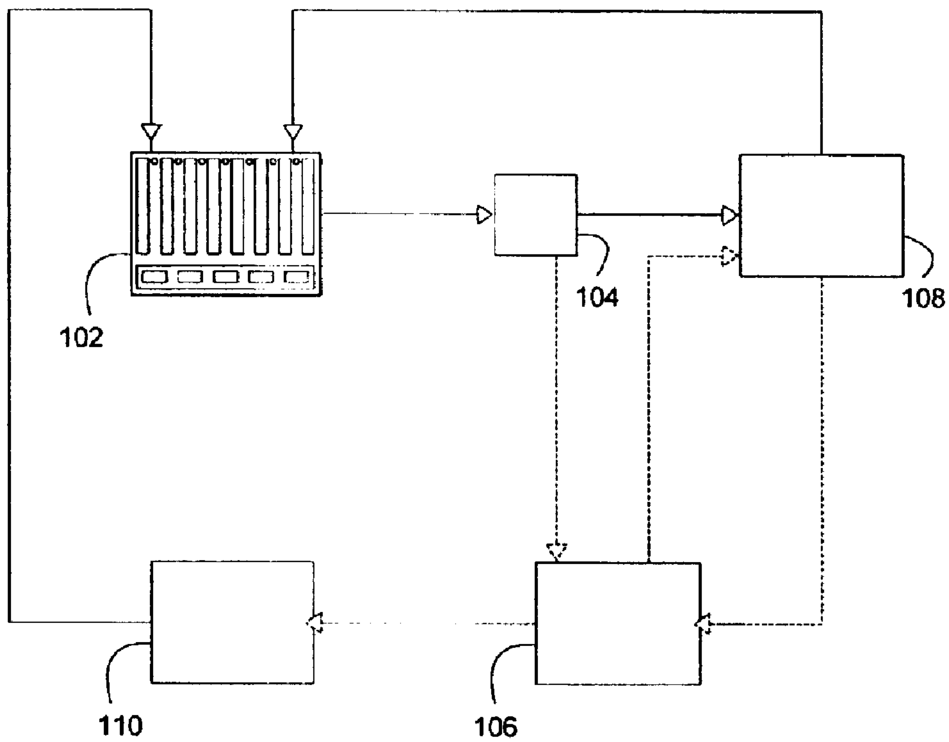
FIG. 2 is a simplified block diagram of an alternate embodiment of an electrochemical power source system.

FIG. 2 is a block diagram of an alternative embodiment of a metal-based fuel cell in which, compared to FIG. 1, like elements are referenced with like identifying numerals. Dashed lines are flow paths for the recirculating reaction solution when the optional regeneration unit is present and running. Solid lines are flow paths for the recirculating anode fluid when the fuel cell system is running in idle or discharge mode. As illustrated, in this embodiment, when the system is operating in the discharge mode, optional regeneration unit 106 need not be in the flow path represented by the solid lines.

An advantage of fuel cells relative to traditional power sources such as lead acid batteries is that they can provide longer term primary and/or auxiliary/backup power more efficiently and compactly. This advantage stems from the ability to continuously refuel the fuel cells using fuel stored with the fuel cell, from some other source, and/or regenerated from reaction products by the optional regeneration unit 106. In the case of the metal (e.g., zinc) fuel cell, for example, the duration of time over which energy can be provided is limited only by the amount of fuel and reaction medium (if used) which is initially provided in the fuel storage unit, which is fed into the system during replacement of a fuel storage unit 108, and/or which can be regenerated from the reaction products that are produced. Thus, the system, comprising at least one fuel cell that comprises an optional regeneration unit 106 and/or a replaceable fuel storage unit 108, can provide primary and/or auxiliary/backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more.

Moreover, the system can optionally can be configured to expel substantially no reaction product(s) outside of the system (e.g., into the environment).

Returning from the introduction to electrochemical power systems, particle-based electrochemical power system component(s) in accordance with the invention can comprise a power source, a fuel storage unit, a filter system, and one or more flow paths between the fuel storage unit and the power source. The fuel storage unit can contain a multiphase flowable fuel that comprises a particulate phase. The filter system can be configured to retain particles of the particulate phase whose largest cross-sectional dimension is greater than a predetermined distance. The one or more flow paths can be configured to provide the multiphase flowable fuel between the fuel storage and the power source, and to provide that at least one of the flow paths is directed through the filter system.

Multiphase fluid characteristics (e.g., particle weight percent, superficial velocity), predetermined distances, particle characteristics, and average largest cross-sectional dimensions of particles for the particle-based electrochemical power system component(s) are as set forth in the description of the filter system above, and can each be alternatively or additionally incorporated into the invention particle-based electrochemical power system component(s).

The filter system, and its additional or alternative components and/or configurations are also as set forth above, and each of these components and/or configurations can be alternatively or additionally incorporated into the invention particle-based electrochemical power system component(s).

In an additional aspect, the invention comprises method(s) of using particle-based electrochemical power source component(s), which component(s) can comprise a filter system and one or more flow paths for a multiphase fluid that comprises a particulate phase. Using can comprise operating, testing, other utilizings, and the like, and suitable combinations thereof. The method(s) can comprise delivering a flow of the multiphase fluid through the filter system along at least one of the flow paths. The method(s) can further comprise configuring the filter system to retain particles of the particulate phase whose largest cross-sectional dimension is greater than a predetermined distance.

Multiphase fluid characteristics (e.g., particle weight percent, superficial velocity), predetermined distances, particle characteristics, and average largest cross-sectional dimensions of particles for the method(s) of using particle-based electrochemical power source component(s) are as set forth in the description of the filter system above, and can each be alternatively or additionally incorporated into the invention method(s) of using particle-based electrochemical power source component(s).

The filter system, and its additional or alternative components and/or configurations are also as set forth above, and each of these components and/or configurations can be alternatively or additionally incorporated into the invention method(s) of using particle-based electrochemical power source component(s).

In another aspect, the invention comprises particle-based electrochemical power system(s) that comprise component(s) in accordance with a further aspect of the invention.

Multiphase fluid characteristics (e.g., particle weight percent, superficial velocity), predetermined distances, particle characteristics, and average largest cross-sectional dimensions of particles for the particle-based electrochemical power system(s) are as set forth in the description of the filter system above, and can each be alternatively or additionally incorporated into the invention method(s) of using particle-based electrochemical power source component(s).

The filter system, and its additional or alternative components and/or configurations are also as set forth above, and each of these components and/or configurations can be alternatively or additionally incorporated into the invention particle-based electrochemical power system(s).

In a further aspect, the invention comprises method(s) of using particle-based electrochemical power source system(s), which system(s) can comprise component(s) in accordance with a further aspect of the invention (e.g., a power source, a fuel storage unit, a filter system and one or more flow paths for a multiphase fluid that comprises a particulate phase). Using can comprise operating, testing, other utilizings, and the like, and suitable combinations thereof. The method(s) can comprise delivering a flow of the multiphase fluid through the filter system along at least one of the flow paths. The method(s) can further comprise configuring the filter system to retain particles of the particulate phase whose largest cross-sectional dimension is greater than a predetermined distance.

Multiphase fluid characteristics (e.g., particle weight percent, superficial velocity), predetermined distances, particle characteristics, and average largest cross-sectional dimensions of particles for the method(s) of using particle-based electrochemical power system(s) are as set forth in the description of the filter system above, and can each be alternatively or additionally incorporated into the invention method(s) of using particle-based electrochemical power system(s).

The filter system, and its additional or alternative components and/or configurations are also as set forth above, and each of these components and/or configurations can be alternatively or additionally incorporated into the invention method(s) of using particle-based electrochemical power system(s).

As utilized herein, terms such as "approximately," "about" and "substantially" are intended to allow some leeway in mathematical exactness to account for tolerances that are acceptable in the trade, e.g., any deviation upward or downward from the value modified by "approximately," "about" or "substantially" by any value in the range(s) up to 20% of such value.

As employed herein, the terms or phrases "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

As employed herein, the term "retain" means to remove or filter from one or more flow paths of the electrochemical power system, or to keep on the flow path (e.g., against the filter system 300 through which the multiphase fluid flows) but static or immobile relative to the flow.

EXAMPLE

With reference to FIG. 3A, a filter 300 was constructed from a stainless steel pipe housing. The stainless steel pipe housing was made of 304 stainless steel, had an outer diameter of ¾", an inner diameter of 21.44 millimeters (mm), and a length of 3", with only one end of the pipe housing end face being machined with slots.

The filter was constructed by machining slots into the end face of the stainless steel pipe housing. Eleven slabs 301–311 of stainless steel plate were positioned into the slots so that the length of the slabs was parallel to the longer axis of the stainless steel pipe housing. Each slab had a thin dimension of 0.203 mm, a dimension along the flow path plane (depth) of 5 mm, and varying lengths as needed to bridge two machined slots. Each slab is separated from adjacent slab(s) by 1.597 mm.

The filter 300 was placed in the flow line between the fuel storage tank 108 and the inlet into the power source 102 (e.g., the inlet into the cell stacks).

In one embodiment, the filter 300 was connected to the fuel cell anode. This served to place the filter 300, and any retained particles thereon, at a positive potential relative to the zinc in the fuel cell anodes. Under these conditions, the retained particles on the filter 300 would dissolve to form soluble zinc species and particles having a largest cross-sectional area that is less than 1.597 mm (e.g., the predetermined distance in this example). The filter 300 could be connected to the fuel cell anodes by using a conductive material to make an electrical connection between the fuel cell anode and the metal filter unit.

While various embodiments of the invention have been described, it will be apparent to those of ordinary skill in the art that many more embodiments and implementations are possible that are within the scope of this invention.

What is claimed is:

1. A filter system for use in a flow of a multiphase fluid that comprises a particulate phase, the filter system being configured to provide at least one flow path for the multiphase fluid and to retain particles of the particulate phase whose largest cross-sectional dimension is greater than a predetermined distance, wherein the filter system comprises:

a first plurality of substantially parallel, substantially planar, thin slabs, wherein each slab is separated from adjacent slab(s) by about the predetermined distance, and wherein the slabs are oriented in the filter system so that the substantially planar surface of the slabs is substantially parallel to the multiphase fluid flow; and further comprises a second plurality of substantially parallel, substantially planar, thin slabs downstream from the first plurality along the flow path, wherein each slab of the second plurality is separated by about the predetermined distance from adjacent slab(s) of the second plurality, and wherein the slabs of the second plurality are oriented in the filter system so that the substantially planar surface of the slabs is substantially parallel to the multiphase fluid flow.

2. The filter system of claim 1, wherein the slabs of the second plurality are oriented in the filter system at an angle in the range from about 0 degrees to about 90 degrees relative to the slabs of the first plurality.

3. The filter system of claim 2, wherein the slabs of the second plurality are oriented in the filter system at an angle of about 90 degrees relative to the slabs of the first plurality.

4. A filter system for use in a flow of a multiphase fluid that comprises a particulate phase, the filter system being configured to provide at least one flow path for the multiphase fluid and to retain particles of the particulate phase whose largest cross-sectional dimension is greater than a predetermined distance, wherein the filter system comprises:

a first plurality of substantially parallel, substantially planar, thin slabs, wherein each slab is separated from adjacent slab(s) by about the predetermined distance, and wherein the slabs are oriented in the filter system so that the substantially planar surface of the slabs is substantially parallel to the multiphase fluid flow, and wherein the thin dimension of the thin slabs is in the range from about 500 nm to about 1 mm.

5. A particle-based electrochemical power system component comprising:

a power source;

a fuel storage unit for containing a multiphase flowable fuel that comprises a particulate phase;

a filter system configured to retain particles of the particulate phase whose largest cross-sectional dimension is greater than a predetermined distance; and one or more flow paths for providing the multiphase flowable fuel between the fuel storage unit and the power source, wherein at least one of the flow paths is directed through the filter system;

wherein the filter system comprises a first plurality of substantially parallel, substantially planar, thin slabs, wherein each slab is separated by about the predetermined distance from adjacent slab(s), and wherein the slabs are oriented in the filter system so that the substantially planar surface of the slabs is substantially parallel to the multiphase fluid flow.

6. The particle-based electrochemical power system component of claim 5, wherein each of the slabs comprises a material that is substantially electrically conductive.

7. The particle-based electrochemical power system component of claim 6, wherein the filter system further comprises a DC electrical power supply operatively connected to each of the slabs.

8. The particle-based electrochemical power system component of claim 7, wherein the DC electrical power supply is operating for at least a portion of the time that the filter system is operating.

9. The particle-based electrochemical power system component of claim 7, wherein the DC electrical power supply is operating for the entire time that the filter system is operating.

10. The particle-based electrochemical power system component of claim 5, wherein the filter system configuration further comprises a second plurality of substantially parallel, substantially planar, thin slabs downstream from the first plurality along the flow path, wherein each slab of the second plurality is separated by about the predetermined distance from adjacent slab(s) of the second plurality, and wherein the slabs of the second plurality are oriented in the filter system so that the substantially planar surface of the slabs is substantially parallel to the multiphase fluid flow.

11. The particle-based electrochemical power system component of claim 10, wherein the slabs of the second plurality are oriented in the filter at an angle in the range from about 0 degrees to about 90 degrees relative to the slabs of the first plurality.

12. The particle-based electrochemical power system component of claim 11, wherein the slabs of the second plurality are oriented in the filter at an angle of about 90 degrees relative to the slabs of the first plurality.

13. A particle-based electrochemical power system component comprising:

a power source;

a fuel storage unit for containing a multiphase flowable fuel that comprises a particulate phase;

a filter system configured to retain particles of the particulate phase whose largest cross-sectional dimension is greater than a predetermined distance; and one or more flow paths for providing the multiphase flowable fuel between the fuel storage unit and the power source, wherein at least one of the flow paths is directed through the filter system;

wherein the multiphase fluid flow comprises a reaction solution, and wherein the filter system is configured to operate while the reaction solution flows through the filter system at a superficial velocity in the range from about 10 cm/min to about 200 cm/min.

14. The particle-based electrochemical power system component of claim 5, wherein the thin dimension of the thin slabs is in the range from about 500 nm to about 1 mm.

* * * * *